US012325110B2

(12) United States Patent
Shi et al.

(10) Patent No.: US 12,325,110 B2
(45) Date of Patent: Jun. 10, 2025

(54) IMPACT CONTACT SURFACE SHAPE OF AN IMPACT WRENCH

(71) Applicants: Zhaojun Shi, Dongguan (CN); Canquan Huang, Dongguan (CN)

(72) Inventors: Zhaojun Shi, Dongguan (CN); Canquan Huang, Dongguan (CN)

(73) Assignee: Dongguan USun Technology Co., Ltd., Dongguan (CN)

( * ) Notice: Subject to any disclaimer, the term of this patent is extended or adjusted under 35 U.S.C. 154(b) by 0 days.

(21) Appl. No.: 17/764,518

(22) PCT Filed: Jun. 16, 2021

(86) PCT No.: PCT/CN2021/100262
§ 371 (c)(1),
(2) Date: Mar. 28, 2022

(87) PCT Pub. No.: WO2022/105217
PCT Pub. Date: May 27, 2022

(65) Prior Publication Data
US 2024/0051093 A1    Feb. 15, 2024

(30) Foreign Application Priority Data
Nov. 17, 2020  (CN) .......................... 202022662941.5

(51) Int. Cl.
*B25B 21/02*  (2006.01)
(52) U.S. Cl.
CPC .................................. *B25B 21/02* (2013.01)
(58) Field of Classification Search
CPC ......... B25B 19/00; B25B 21/00; B25B 21/02; B25B 21/023; B25B 21/026; B25B 23/00; B25B 23/0021; B25B 23/1405; B25B 23/147; B25D 11/00; B25D 11/02; B25D 11/06; B25D 17/00; H02K 5/04; H02K 9/06; H02K 11/30
See application file for complete search history.

(56) References Cited

U.S. PATENT DOCUMENTS

| 6,581,697 | B1 * | 6/2003 | Giardino | ............. B25B 23/0021 |
| | | | | 173/171 |
| 2009/0014193 | A1 * | 1/2009 | Barezzani | ............. B25B 21/026 |
| | | | | 173/93 |
| 2009/0223690 | A1 * | 9/2009 | Sugimoto | ............. B25B 21/026 |
| | | | | 173/48 |

FOREIGN PATENT DOCUMENTS

CN            210025095        *   2/2020

* cited by examiner

*Primary Examiner* — Robert J Scruggs (57) ABSTRACT

An impact contact surface shape of an impact wrench. The impact wrench comprises a rotary shaft that acts on the workpiece and an impact block sleeved on the rotary shaft to drive the rotary shaft to rotate. One end of the rotary shaft is at least configured with a stopping block to collide with the impact block. The impact block is at least configured with a locking block to collide with the stopping block. The impact contact surface comprises: at least one first contact surface located on the stopping block to contact and press the locking block and at least one second contact surface located on the locking block to contact and press the first contact surface. The first contact surface and the second contact surface are intermeshing arc shapes or cycloid shapes.

10 Claims, 10 Drawing Sheets

Prior Art

FIG.11

Prior Art

IMPACT CONTACT SURFACE SHAPE OF AN IMPACT WRENCH

BACKGROUND OF INVENTION

1. Field of the Invention

The present invention relates generally to the technical field of electric tools, and more particularly to an impact contact surface shape of an impact wrench.

2. Description of Related Art

Figure 11:
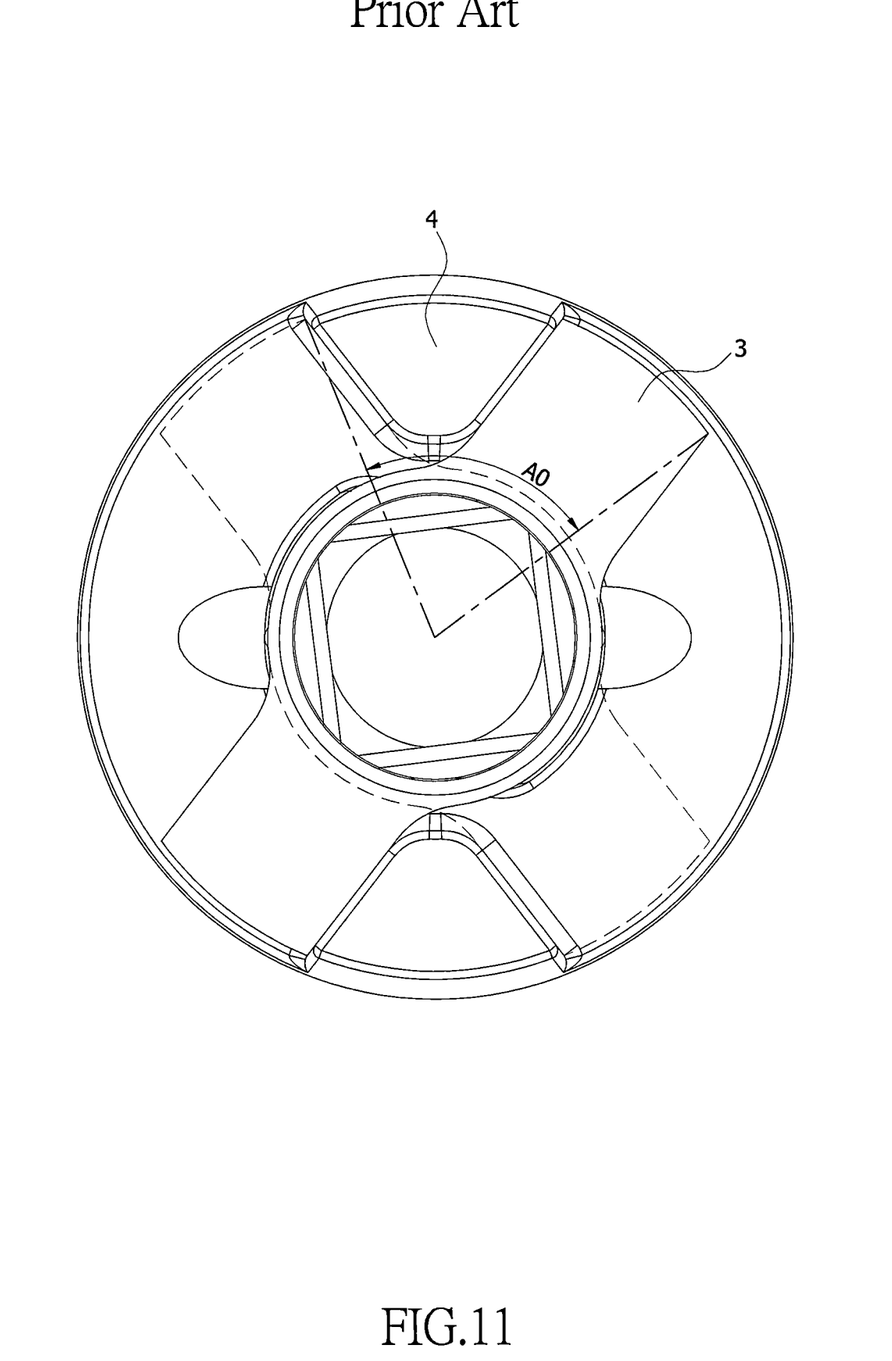
FIG. 11 is Example View 1 of the prior art.
Figure 12:
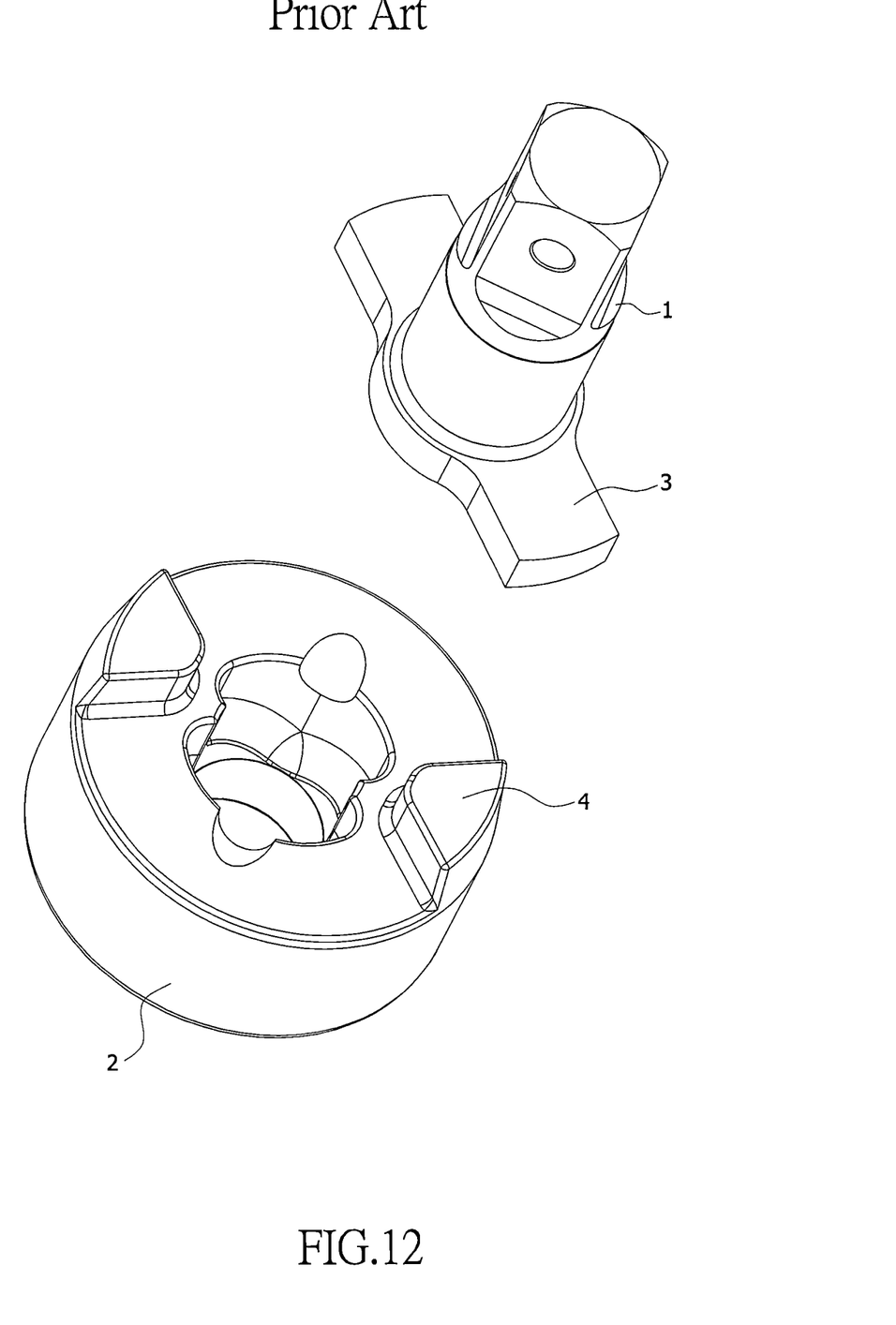
FIG. 12 is Example View 2 of the prior art.

The conventional impact contact surface is in an oblate shape as shown in FIGS. 11 and 12. Upon collision between the stopping block and the locking block, the small contact surface area leads to insufficient transmission of kinetic energy and low mechanic efficiency. Moreover, the oblate contact surface will also cause partial concentration of impact during the collision, leading to uneven stress on different parts of the stopping block and the locking block. This will accelerate partial wearing or even cause crack or breakage of the stopping block and/or the locking block, and consequently reduce the service life of the impact wrench.

In view of this, the present invention proposes the following technical solution.

SUMMARY OF THE INVENTION

The purpose of the present invention is to overcome the deficiencies of the prior art and provide an impact contact surface shape of an impact wrench.

In order to solve the above-mentioned technical problems, the present invention adopts the following technical solutions:

An impact contact surface shape of an impact wrench, wherein the impact wrench comprises a rotary shaft that acts on the workpiece (1) and an impact block (2) sleeved on the rotary shaft (1) to drive the rotary shaft (1) to rotate, one end of the rotary shaft (1) is at least configured with a stopping block (3) to collide with the impact block (2), the impact block (2) is at least configured with a locking block (4) to collide with the stopping block (3); characterized in that: the impact contact surface comprises: at least one first contact surface (31) located on the stopping block (3) to contact and press the locking block (4) and at least one second contact surface (41) located on the locking block (4) to contact and press the first contact surface (31), wherein the first contact surface (31) and the second contact surface (41) are configured in intermeshing arc shape or cycloid shape.

More particularly, the stopping block (3) is formed with two symmetric first contact surfaces (31), and a first transitional surface (32) is formed between the two first contact surfaces (31) and connecting to the two first contact surfaces (31).

More particularly, wherein the locking block (4) is formed with two symmetric second contact surfaces (41), and a second transitional surface (42) is formed between the two second contact surfaces (41) and connected to the two second contact surfaces (41).

More particularly, wherein one end of the rotary shaft (1) is configured with two stopping blocks (3), and the two stopping blocks (3) are centrosymmetric in relation to the central axis of the rotary shaft (1); the first transitional surface (32) is a cambered surface or a curved surface.

More particularly, wherein the impact block (2) is configured with two locking blocks (4), and the two locking blocks (4) are centrosymmetric in relation to the central axis of the impact block (2); the second transitional surface (42) is a cambered surface or a curved surface.

More particularly, wherein the junction between the first contact surface (31) and the rotary shaft (1) is formed with a first arc-shaped transitional surface or a first curved transitional surface (33).

More particularly, wherein the impact block (2) comprises a seat body (21) and connecting blocks (22) formed on the seat body (21) and connected to the two locking blocks (4), there are two symmetrically configured connecting blocks (22), which are connected with the two locking blocks (4) to form a chamber (23) to house the stopping block (3), the connecting block (22) is arc-shaped or curved, and is formed with a second arc-shaped transitional surface or a second curved transitional surface (24) at the position in conjunction with the second contact surface (41).

More particularly, wherein the rotary shaft (1) comprises a main body (11) that acts on the workpiece and a flange (12) formed on the other end of the main body (11) and placed inside the chamber (23) of the impact block (2), the stopping block (3) is formed on the flange (12), the first arc-shaped transitional surface or the first curved transitional surface (33) is formed on the junction between the flange (12) and the stopping block (3).

More particularly, wherein the first contact surface (31) and the second contact surface (41) are in intermeshing logarithmic spiral shapes.

More particularly, wherein the rotary shaft (1) is configured with a base plate (13) to load the stopping block. (3), the base plate (13) is located at one end of the rotary shaft (1), the stopping block (3) is formed on the base plate (13).

Comparing to the prior art, the present invention has the following effects and benefits:

1. In the present invention, the first contact surface on the stopping block and the second contact surface on the locking block are configured in intermeshing arc shapes, or cycloid shapes, or logarithmic spiral shapes. Such a configuration maximizes the contact area between the first contact surface and the second contact surface during collision, so as to evenly distribute the acting force generated by the collision, and to avoid partial concentration of contact impact on the first contact surface and the second contact surface, thus reducing the partial contact impact between the locking block and the stopping, block, reducing wear and tear of the locking block and the stopping block, and increasing the service life of the rotary shaft and the impact block. Apart from reducing the partial contact impact between the stopping block and locking block, the configuration of the first contact surface on the stopping block and the second contact surface on the locking block in arc shapes or cycloid shapes or logarithmic spiral shapes can also reduce the timed angle A1 when the impact block is withdrawn and the locking block crosses the stopping block, thus enhances the smoothness in operating the impact wrench.
2. Because the first contact surface and the second contact surface contact and mesh each other almost in the entire area during collision, the acting force generated by the impact block will be transmitted to the rotary shaft to the maximum degree. Therefore, the overall mechanical efficiency of the impact wrench is improved. Secondly, the first contact surface of the stopping block and the second contact surface of the locking block both adopt symmetric configuration, the bottom portions of the stopping block and locking block are large enough to endure a strong stress, thus avoiding breakage of the bottom portion during collision between the stopping block and the locking block.

3. Because there are two stopping blocks and two locking blocks, both in centrosymmetric configuration, and each stopping block and locking block is symmetrically configured with two first contact surfaces and two second contact surfaces, when the stopping block and locking block collide and contact each other, one first contact surface on each stopping block will collide with and press one second contact surface on each locking block. Moreover, as the first contact surfaces and second contact surfaces colliding each other at the same time are both centrosymmetric, during operation of the impact wrench, the collision between the first contact surface and the second contact surface can generate aligned overlapping between the spindle of the rotary shaft and the spindle of the impact block, thus providing a "central adjustment" function to avoid change of coaxiality between the rotary shaft and the impact block and improving the mechanical efficiency of the impact wrench.

DETAILED DESCRIPTION OF THE INVENTION

China Patent Application No. 201721655062.1 has disclosed a specific structure of an impact wrench, and the detailed operation of the impact wrench. However, as described, the present invention has a different contact surface between the rotary shaft and the impact block of the impact wrench.

Figure 1:
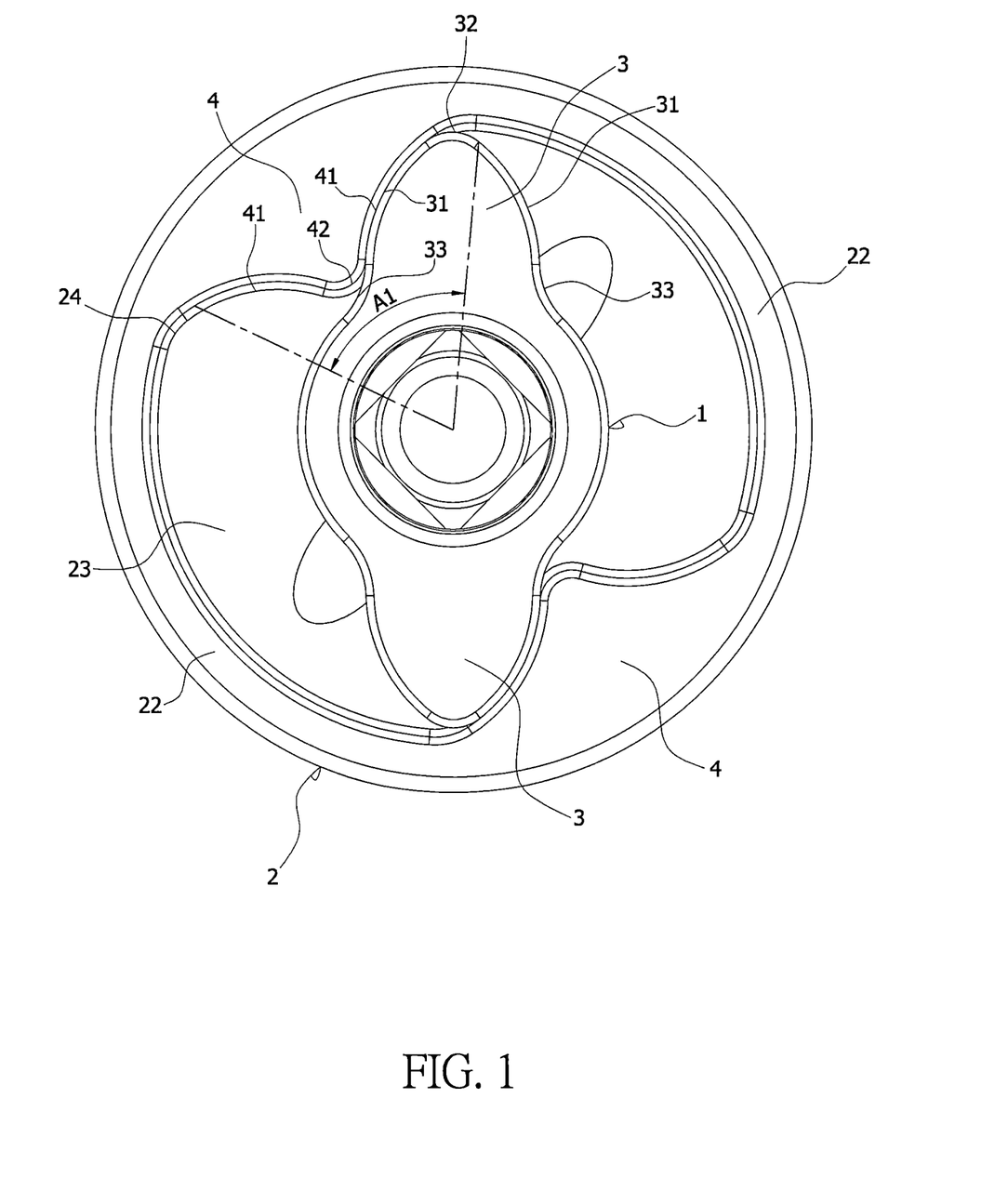
FIG. 1 is a top view of Embodiment 1 of the present invention.
Figure 10:
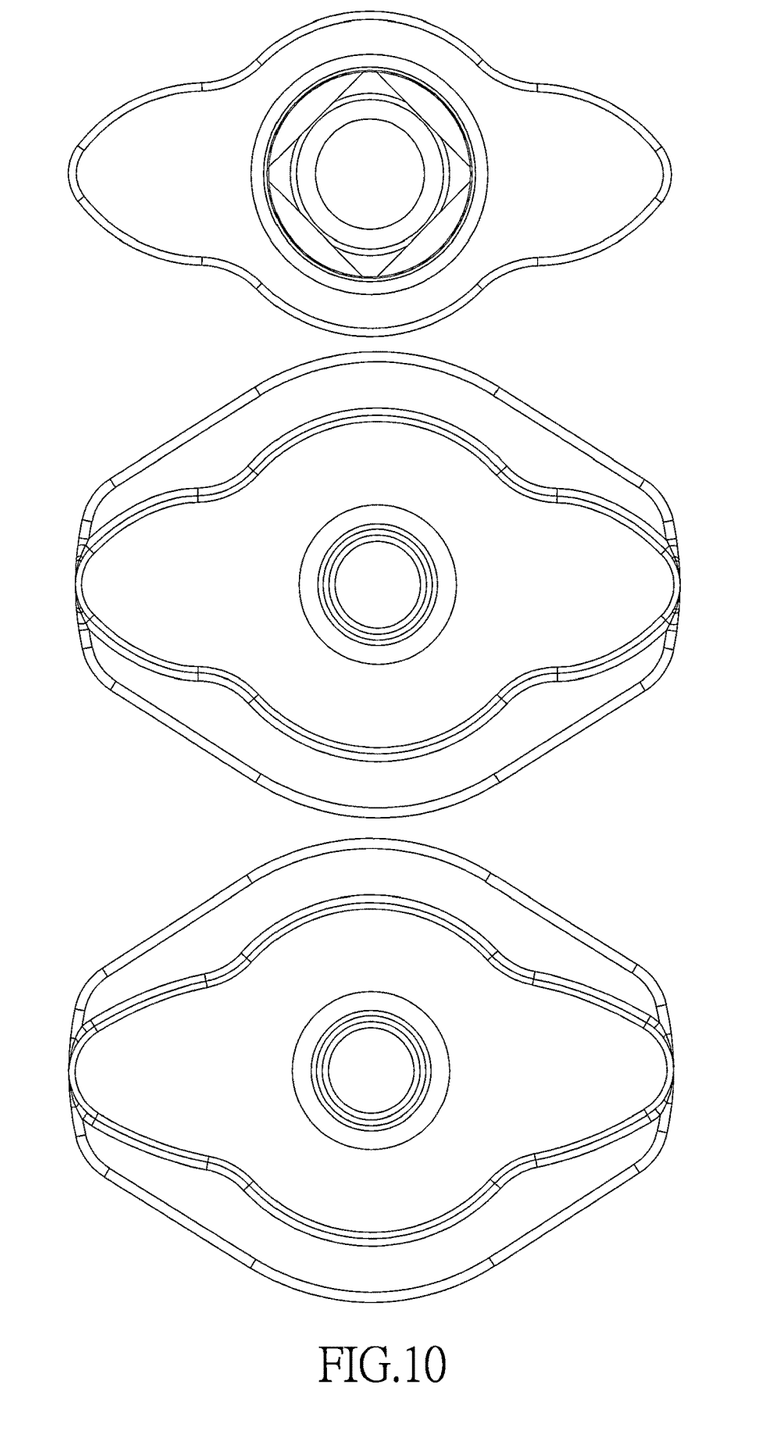
FIG. 10 is a comparative view between arc shape, cycloid shape, and logarithmic spiral shapes according to the present invention.

FIG. 1 and FIG. 10 discloses an impact contact surface shape of an impact wrench, wherein, the impact wrench comprises a rotary shaft that acts on the workpiece 1 and an impact block 2 sleeved on the rotary shaft 1 to drive the rotary shaft 1 to rotate. One end of the rotary shaft 1 is at least configured with a stopping block 3 to collide with the impact block 2, the impact block 2 is at least configured with a locking block 4 to collide with the stopping block 3. Characteristically, the impact contact surface comprises: at least one first contact surface 31 located on the stopping block 3 to contact and press the locking block 4 and at least one second contact surface 41 located on the locking block 4 to contact and press the first contact surface 31. The first contact surface 31 and the second contact surface 41 are configured in intermeshing arc shapes, or cycloid shapes, or logarithmic spiral shapes.

The stopping block 3 is formed with two symmetric first contact surfaces 31, and a first transitional surface 32 is formed between the two first contact surfaces 31 and connected with the two first contact surfaces 31. The two symmetrically configured first contact surfaces 31 and the first transitional surface 32 forms the arc-shape tooth or cycloid tooth of the stopping block 3. The symmetric configuration of the first contact surfaces 31 of the stopping block 3 can increase the size of the bottom portion and reduce the size of the top portion of the stopping block 3, so as to endure stronger stress, thus avoiding breakage of the bottom portion during collision between the stopping block 3 and the locking block 4, and reducing the weight of the stopping block 3 itself to save raw materials and to reduce moment of inertia.

The locking block 4 is formed with two symmetric second contact surfaces 41, and second transitional surface 42 is formed between the two second contact surfaces 41 and connected with the two second contact surfaces 41. The two symmetrically configured second contact surfaces 41 and the second transitional surface 42 form the arc-shape tooth or cycloid tooth of the locking block 4. The symmetric configuration of the second contact surfaces 41 of the locking block 4 can increase the size of the bottom portion and reduce the size of the top portion of the locking block 4, so as to endure stronger stress, thus avoiding breakage of the bottom portion during collision between the locking block 4 and the stopping block 3, and reducing the weight of the locking block 4 itself to save raw materials to reduce moment of inertia.

Figure 2:
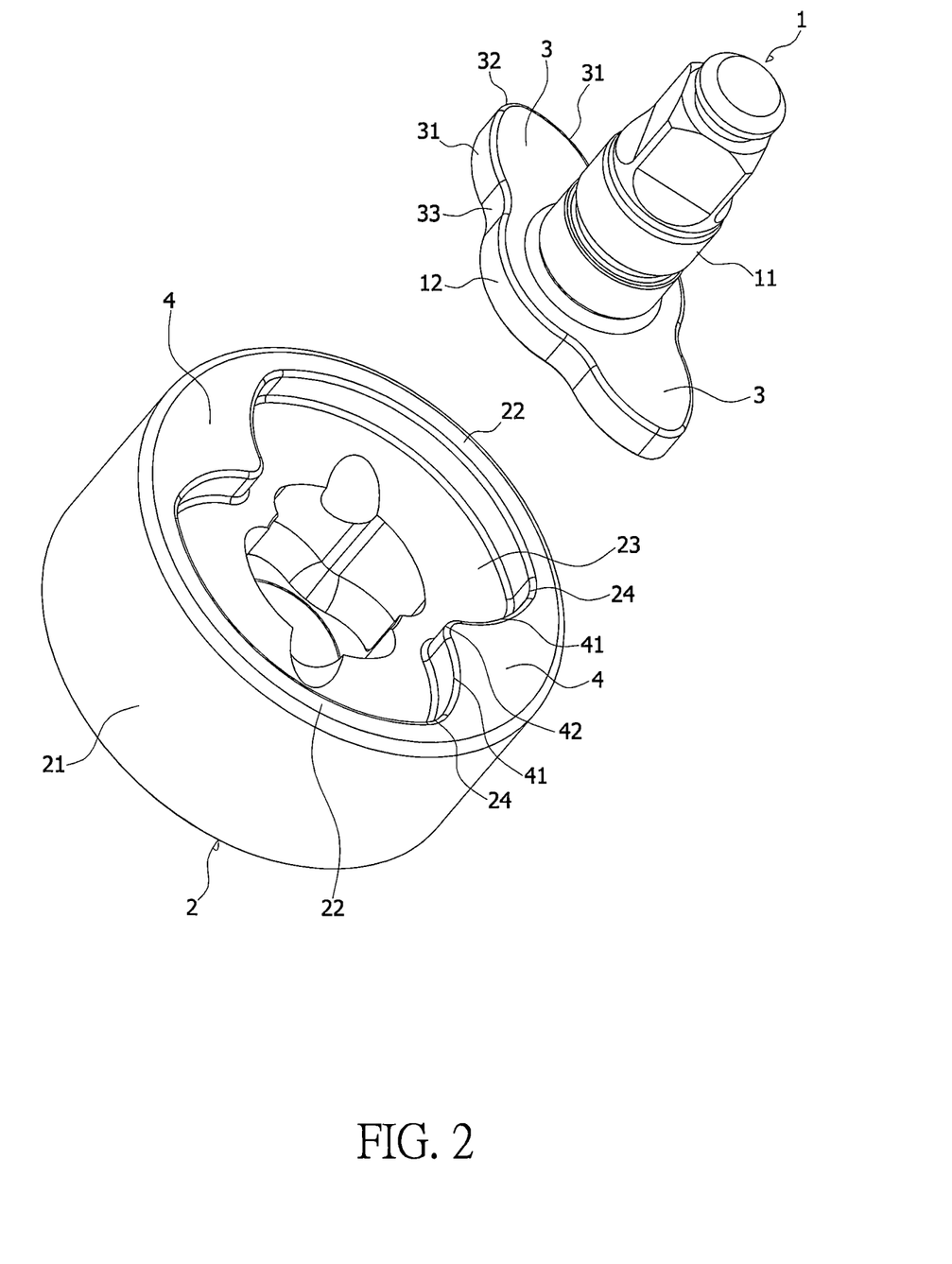
FIG. 2 is an exploded view of Embodiment 1 of the present invention.
Figure 3:
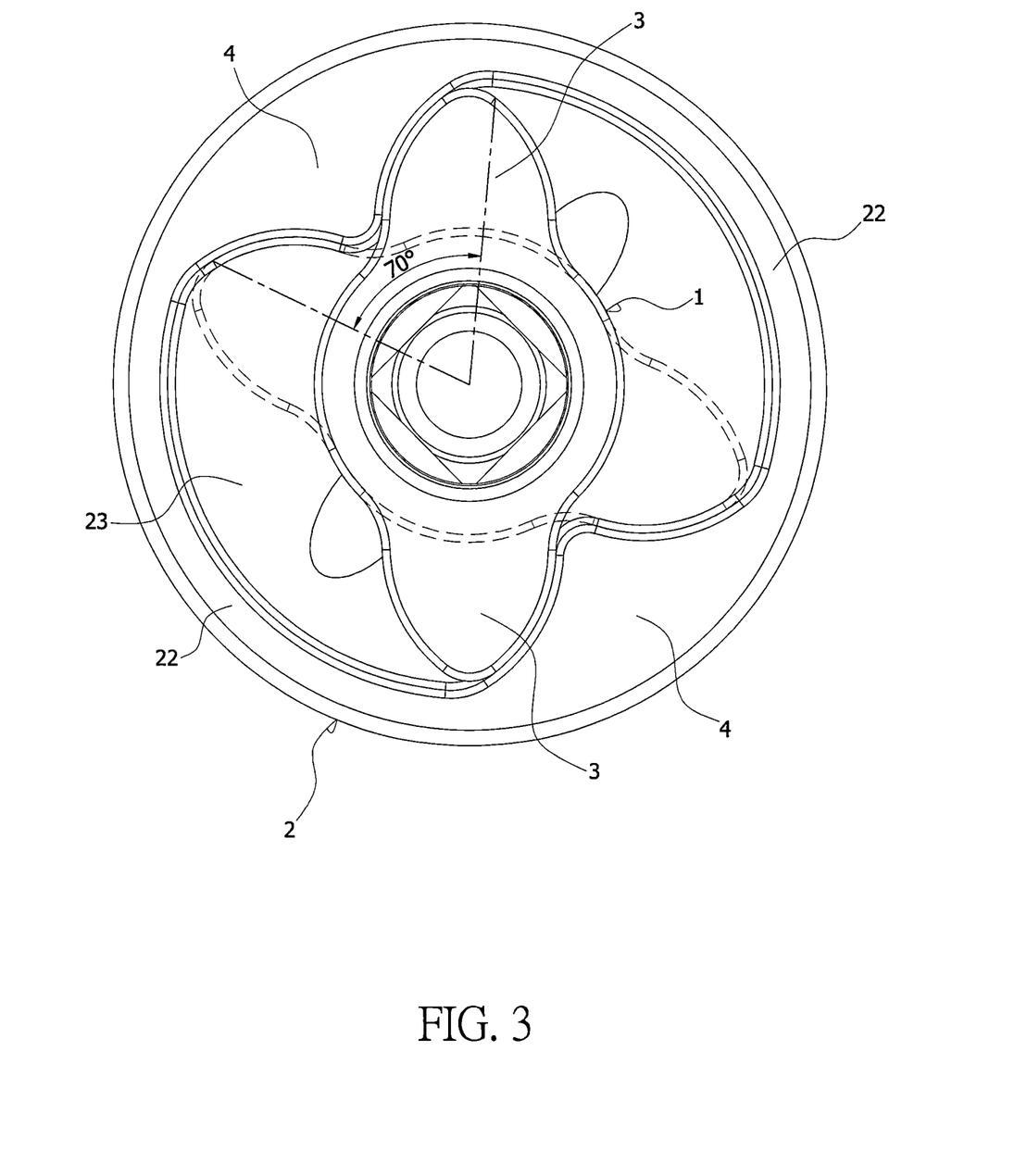
FIG. 3 is a schematic view of the swing of the timed angle A1 according to the present invention.

Disclosed in FIG. 1 to FIG. 3 is Embodiment 1 of the present invention. In this embodiment, the first contact surface 31 and the second contact surface 41 are both arc-shaped. Comparing to the conventional oblate-shaped impact contact surface (see FIG. 11), using arc-shaped contact surfaces on the stopping block 3 and the locking block 4 can allow the cross sections of the stopping block 3 and the locking block 4 to be gradually reduced from the bottom portion to the top portion. When the timed angle A1 equals the timed angle A0, the stopping block 3 and locking block 4 of the present invention will have larger bottom portions to endure stronger stress.

Figure 4:
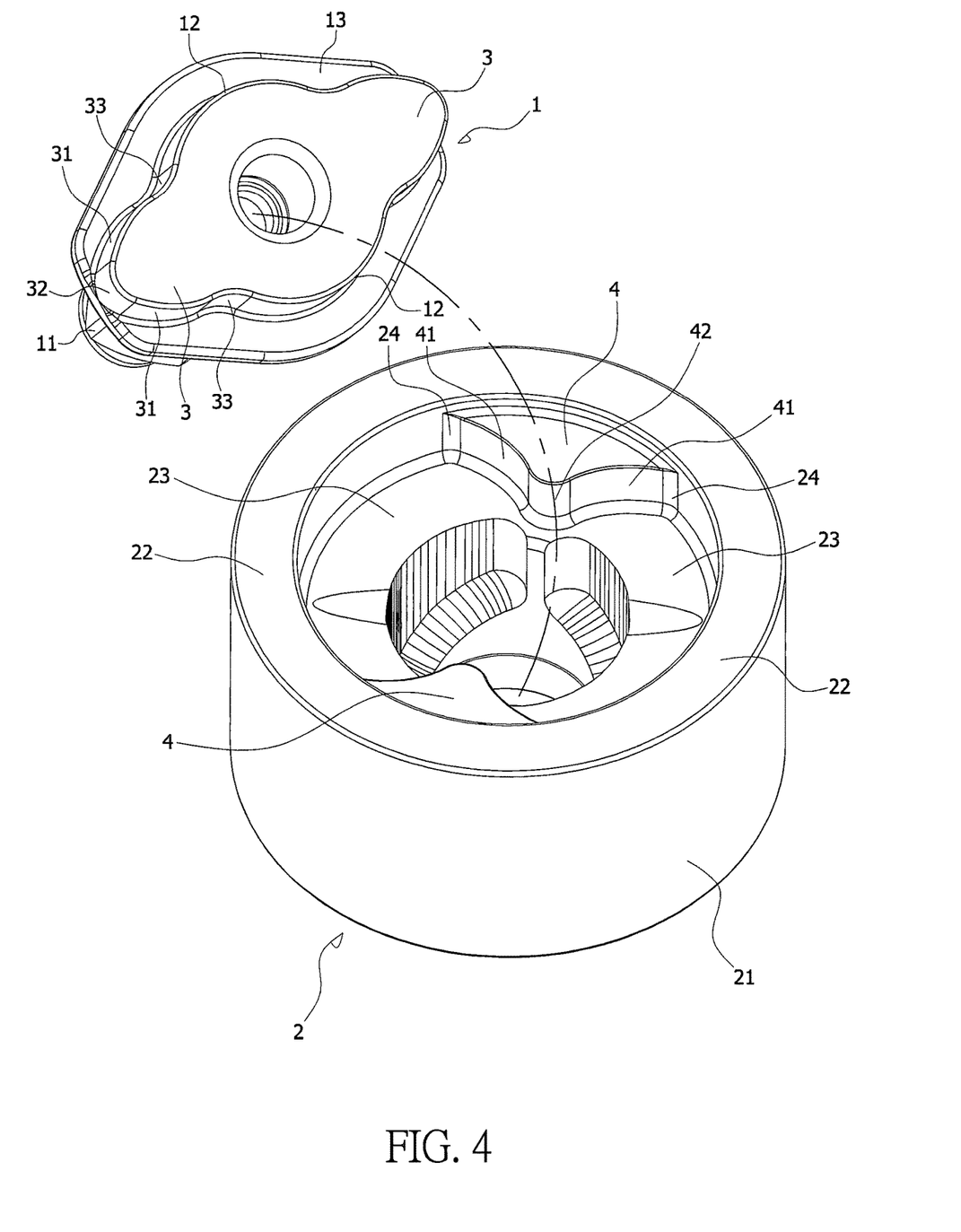
FIG. 4 is an exploded view of Embodiment 2 of the present invention.
Figure 5:
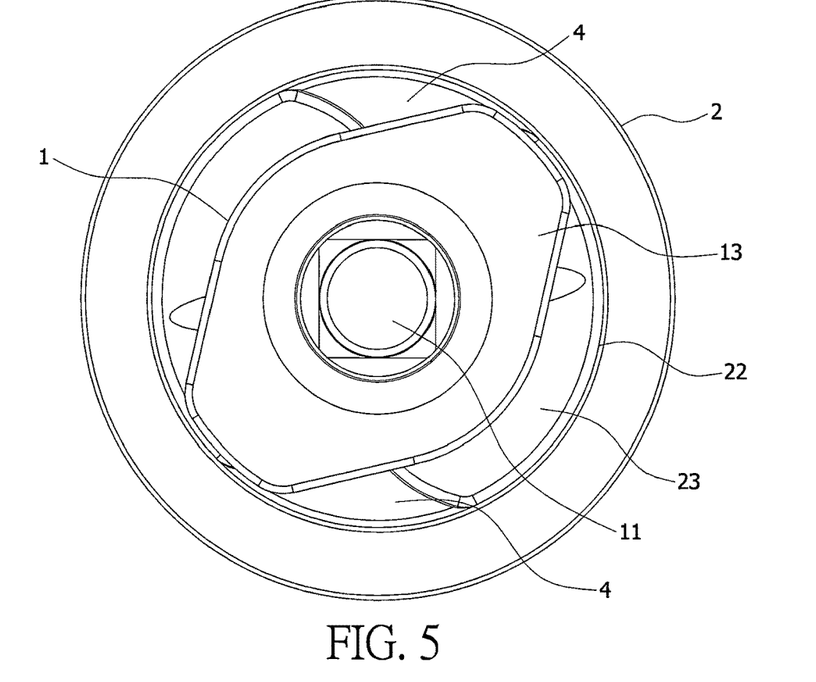
FIG. 5 is a top view of Embodiment 2 of the present invention.
Figure 6:
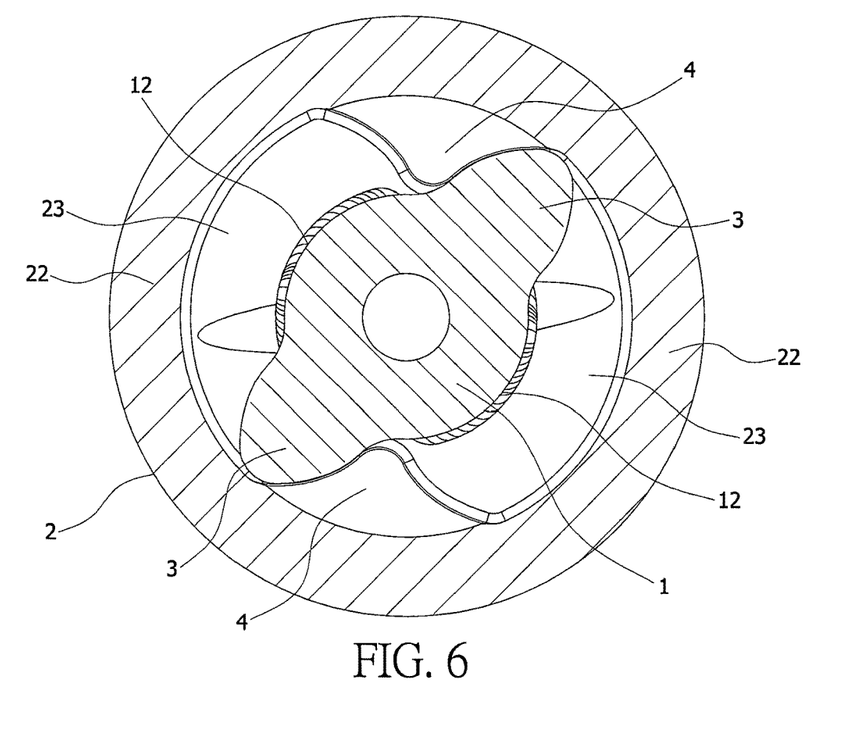
FIG. 6 is a schematic view showing the in-contact state of the contact surface of Embodiment 2 according to the present invention.

Disclosed in FIG. 4 to FIG. 6 is Embodiment 2 of the present invention. In this embodiment, the first contact surface 31 and the second contact surface 41 are both in a cycloid shape, wherein, the cycloid has two different cases:

$$\text{epicycloid:} \begin{cases} X = (R_1 + r_a)\sin\theta - r_a \sin\left(\frac{R_1 + r_a}{r_a}\theta\right) \\ Y = (R_1 + r_a)\cos\theta - r_a \cos\left(\frac{R_1 + r_a}{r_a}\theta\right) \end{cases}$$

$$\text{hypocycloid:} \begin{cases} X = (R_1 + r_b)\sin\phi - r_b \sin\left(\frac{R_1 + r_b}{r_b}\phi\right) \\ Y = (R_1 + r_b)\cos\phi - r_b \cos\left(\frac{R_1 + r_b}{r_b}\phi\right) \end{cases}$$

where, $R_1$—radius of base circle; $r_2$—radius of outer rolling circle; $r_b$—radius of inner rolling circle.

In the present embodiment, $R_1$=11.1 mm, $r_a$=300.0 mm. Comparing to the conventional oblate-shaped impact contact surface (see FIG. 11), using cycloid-shaped contact surfaces on the stopping block 3 and locking block 4 can allow the cross sections of the stopping block 3 and locking block 4 to be reduced gradually from the bottom portion to the top portion. When the timed angle A1 equals the timed angle A0, the stopping block 3 and locking block 4 of the present invention will have large bottom portions to endure stronger stress.

Figure 7:
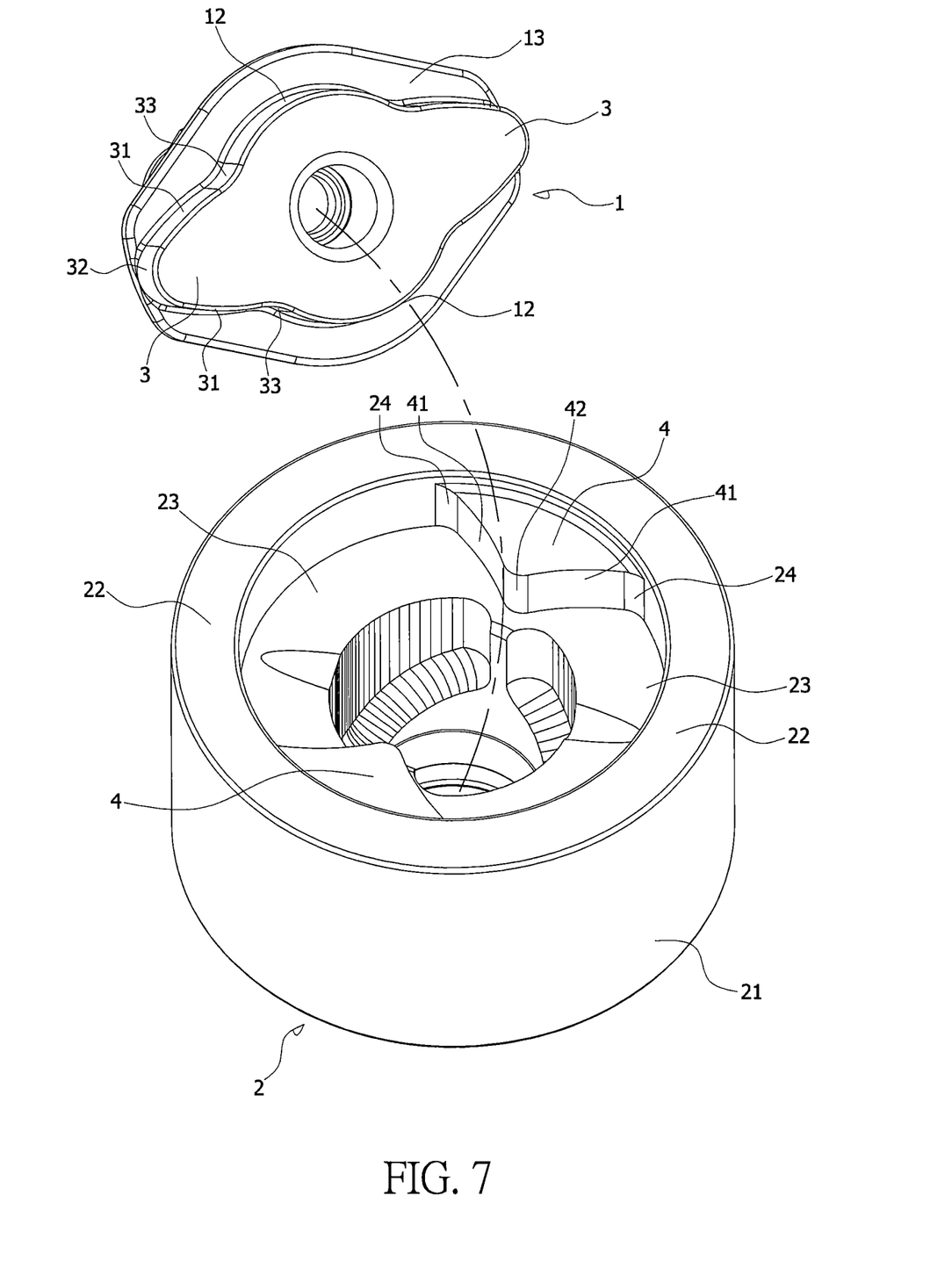
FIG. 7 is an exploded view of Embodiment 3 of the present invention
Figure 8:
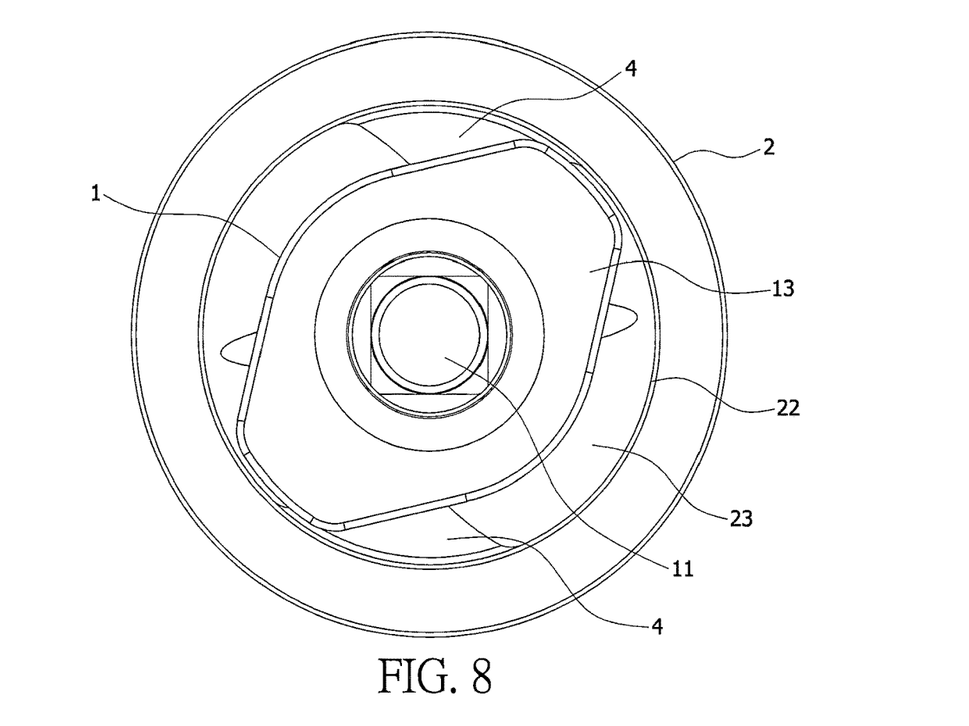
FIG. 8 is a top view of Embodiment 3 of the present invention.
Figure 9:
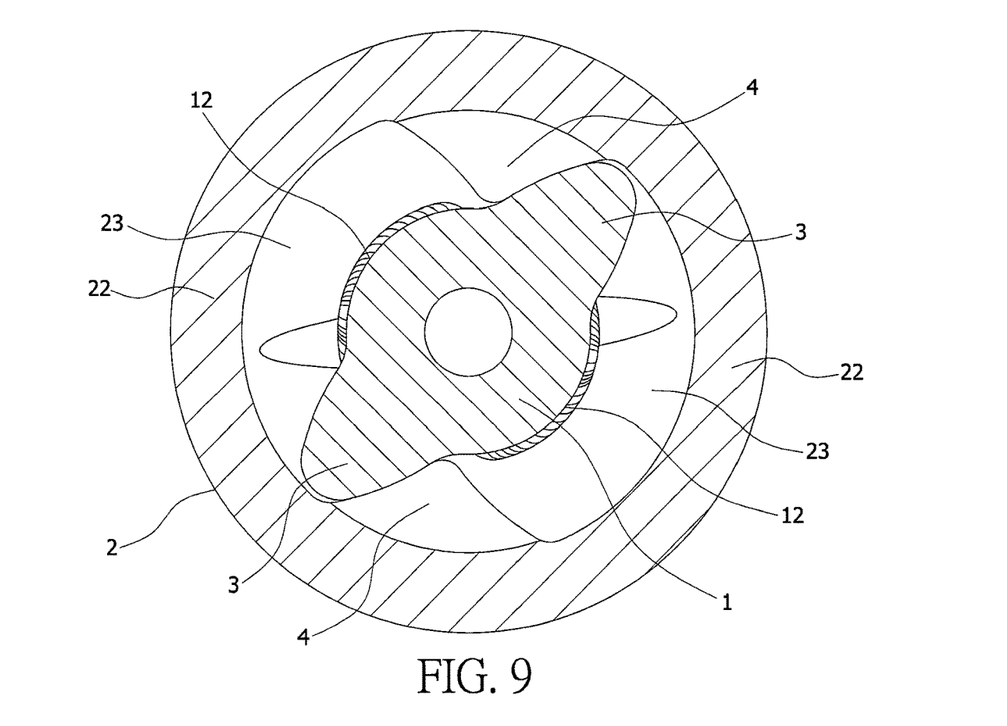
FIG. 9 is a schematic view showing the in-contact state of the contact surface of Embodiment 3 according to the present invention.

Disclosed in FIG. 7 to FIG. 9 is Embodiment 3 of the present invention. In this embodiment, the first contact surface 31 and the second contact surface 41 are both in logarithmic spiral shapes, wherein, the formula of the logarithmic spiral is as follows:

$$\begin{cases} X(\theta) = r_0 e^{k\theta} \cos\theta \\ Y(\theta) = r_0 e^{k\theta} \sin\theta \end{cases}$$

where, r0—distance from the origin in polar coordinates; θ—angle in polar coordinates; r—polar radius.

In the present embodiment, $r_0$=7 mm, k=tan(40°). Comparing to the conventional oblate-shaped impact contact surface (see FIG. 11), using logarithmic spiral contact surfaces on the stopping block 3 and locking block 4 can allow the cross section of the stopping block 3 and locking block 4 to be reduced gradually from the bottom portion to the top portion. When the timed angle A1 equals timed angle A0 the stopping block 3 and locking block 4 of the present invention will have larger bottom portions to endure stronger stress. Secondly, using logarithmic spiral can offer the following features:
1. Every point on the same spiral has the same spiral angle and pressure angle;
2. The logarithmic spiral is congruent to its equidistance curve;
3. The logarithmic spiral has a shape-retentive property, $$\frac{r_3}{r_1} = \frac{r_2}{r_0} e^{k(\theta+\theta^1)};$$

4. Smoothness (the curve is smooth with no outlier points);
5. Non-interference;
6. Continuity.

One end of the rotary shaft 1 is configured with two stopping blocks 3, and the two stopping blocks 3 are centrosymmetric in relation to the central axis of the rotary shaft 1. The first transitional surface 32 is a cambered surface or a curved surface. The impact block 2 is configured with two locking blocks 4, and the two locking blocks 4 are centrosymmetric in relation to the central axis of the impact block 2. The second transitional surface 42 is a cambered surface or a curved surface. The arc shape or curved shape of the first transitional surface 32 and the second transitional surface 42 can avoid concentration of stress during collision between the rotary shaft 1 and the impact block 2, thus avoiding crack on the transitional surface. Moreover, during collision and separation between the stopping block 3 and the locking block 4, the contact will be smooth, thus reducing wear and tear and improving smoothness in operating the impact wrench.

The junction between the first contact surface 31 and the rotary shaft 1 is formed with a first arc-shaped transitional surface or a first curved transitional surface 33.

The impact block 2 comprises a seat body 21 and connecting blocks 22 formed on the seat body 21 and connected with the two locking blocks 4. There are two symmetrically configured connecting blocks 22. They are connected to the two locking blocks 4 to form a chamber 23 to house the stopping block 3. The connecting blocks 22 are arc-shaped or curved, and their junction with the second contact surface 41 is formed with a second arc-shaped transitional surface or a second curved transitional surface 24. The second arc-shaped transitional surface or second curved transitional surface 24 at the junction between the connecting block 22 and the second contact surface 41 can avoid concentration of stress during collision between the rotary shaft 1 and the impact block 2, and thereby avoid crack or breakage at the junction to increase the service life of the impact block 2.

The rotary shaft 1 comprises a main body 11 that acts on the workpiece and a flange 12 formed on the other end of the main body 11 and placed inside the chamber 23 of the impact block 2. The stopping block 3 is formed on the flange 12. The first arc-shaped transitional surface or first curved transitional surface 33 is formed at the junction between the flange 12 and the stopping block 3. The first arc-shaped transitional surface or first curved transitional surface 33 at the junction between the first contact surface 31 and the flange 1 can avoid concentration of stress during collision between the rotary shaft 1 and the impact block 2, thus avoiding crack or breakage at the junction and increasing the service life of the rotary shaft 1.

The rotary shaft 1 is configured with a base plate 13 to load the stopping block 3. The base plate 13 is located at one end of the rotary shaft 1, and the stopping block 3 is formed on the base plate 13.

In summary, in one embodiment, during operation of the present invention, the impact block 2 rotates clockwise to collide with the rotary shaft 1, and drives the rotary shaft 1 to rotate. During collision, the second contact surface 41 of the locking block 4 and the first contact surface 31 of the stopping block 3 collide with each other to generate a pushing force, pushing the rotary shaft 1 to have one rotation. Because the first contact surface 31 and the second contact surface 41 are both in intermeshing arc shapes, or cycloid shapes, or logarithmic spiral shapes, during collision between the first contact surface 31 and the second contact surface 41, the contact area is maximized. This allows even distribution of the acting force generated by the collision, thus avoiding partial concentration of contact impact on the first contact surface 31 and the second contact surface 41, reducing partial contact impact between the locking block 4 and stopping block 3, reducing wear and tear of the locking block 4 and stopping block 3, and increasing the service life of the rotary shaft 1 and impact block 2. Apart from reducing the partial contact impact between the stopping block 3 and locking block 4, the arc shapes or cycloid shapes or logarithmic spiral shapes adopted by the first contact surface 31 of the stopping block 3 and the second contact surface 41 of the locking block 4 can also reduce the timed angle A1 when the impact block 2 withdraws and when the locking block 4 crosses the stopping block 3, thus enhancing the smoothness in operating the impact wrench. Meanwhile, because the first contact surface 31 and the second contact surface 41 contact and mesh each other almost in the entire area during collision, the acting force generated by the impact block 2 will be transmitted to the rotary shaft 1 to the maximum degree. Therefore, the overall mechanical efficiency of the impact wrench is improved. Secondly, there are two stopping blocks 3 and two locking blocks 4, both centrosymmetrically configured, and each stopping block 3 and locking block 4 is symmetrically configured with two first contact surfaces 31 and two second contact surfaces 41. Therefore, during contact and collision between the stopping block 3 and the locking block 4, one first contact surface 31 of each stopping block 2 will press and collide with one second contact surface 41 of each locking block 4. As the first contact surfaces 31 and second contact surfaces 41 colliding each other at the same time are both centrosymmetric, during operation of the impact wrench, the collision between the first contact surface 31 and the second contact surface 41 can generate aligned overlapping between the spindle of the rotary shaft 1 and the spindle of the impact block 2, thus providing a "central adjustment" function to avoid change of coaxiality between the rotary shaft and the impact block and improving the mechanical efficiency of the impact wrench.

We claim:

1. An impact contact surface shape of an impact wrench, wherein the impact wrench comprises a rotary shaft (1) that acts on a workpiece and an impact block (2) sleeved on the rotary shaft (1) to drive the rotary shaft (1) to rotate, one end of the rotary shaft (1) is at least configured with a stopping block (3) to collide with the impact block (2), the impact block (2) is at least configured with a locking block (4) to collide with the stopping block (3);

the impact contact surface comprises: at least one first contact surface (31) located on the stopping block (3) to contact and press the locking block (4) and at least one second contact surface (41) located on the locking block (4) to contact and press the first contact surface (31), wherein the first contact surface (31) and the second contact surface (41) are mutually engaged in a cycloid-shaped contact, the cycloid has two different cases, $$\text{epicycloid:} \begin{cases} X = (R_1 + r_a)\sin\theta - r_a\sin\left(\frac{R_1 + r_a}{r_a}\theta\right) \\ Y = (R_1 + r_a)\cos\theta - r_a\cos\left(\frac{R_1 + r_a}{r_a}\theta\right) \end{cases}$$

$$\text{hypocycloid:} \begin{cases} X = (R_1 - r_b)\sin\phi - r_b\sin\left(\frac{R_1 - r_a}{r_a}\phi\right) \\ Y = (R_1 - r_b)\cos\phi - r_b\cos\left(\frac{R_1 - r_b}{r_b}\phi\right) \end{cases}$$

where:
$R_1$ is the base circle radius,
$r_a$ is the external circle radius,
$r_b$ is the internal circle radius.

2. The impact contact surface shape of an impact wrench defined in claim 1, the stopping block (3) is formed with two symmetric first contact surfaces (31), and a first transitional surface (32) is formed between the two first contact surfaces (31) and connecting to the two first contact surfaces (31).

3. The impact contact surface shape of an impact wrench defined in claim 2, wherein one end of the rotary shaft (1) is configured with two stopping blocks (3), and the two stopping blocks (3) are centrosymmetric in relation to the central axis of the rotary shaft (1); the first transitional surface (32) is a cambered surface or a curved surface.

4. The impact contact surface shape of an impact wrench defined in claim 3, wherein a junction between the first contact surface (31) and the rotary shaft (1) is formed with a first arc-shaped transitional surface or a first curved transitional surface (33).

5. The impact contact surface shape of an impact wrench defined in claim 4, wherein the rotary shaft (1) comprises a main body (11) that acts on the workpiece and a flange (12) formed on the other end of the main body (11) and placed inside a chamber (23) of the impact block (2), the stopping block (3) is formed on the flange (12), the first arc-shaped transitional surface or the first curved transitional surface (33) is formed on the junction between the flange (12) and the stopping block (3).

6. The impact contact surface shape of an impact wrench defined in claim 1, wherein the locking block (4) is formed with two symmetric second contact surfaces (41), and a second transitional surface (42) is formed between the two second contact surfaces (41) and connected to the two second contact surfaces (41).

7. The impact contact surface shape of an impact wrench defined in claim 6, wherein the impact block (2) is configured with two locking blocks (4), and the two locking blocks (4) are centrosymmetric in relation to the central axis of the impact block (2); the second transitional surface (42) is a cambered surface or a curved surface.

8. The impact contact surface shape of an impact wrench defined in claim 7, wherein the impact block (2) comprises a seat body (21) and connecting blocks (22) formed on the seat body (21) and connected to the two locking blocks (4), there are two symmetrically configured connecting blocks (22), which are connected with the two locking blocks (4) to form a chamber (23) to house the stopping block (3), the connecting block (22) is arc-shaped or curved, and is formed with a second arc-shaped transitional surface or a second curved transitional surface (24) at the position in conjunction with the second contact surface (41).

9. The impact contact surface shape of an impact wrench defined in claim 1, wherein the first contact surface (31) and the second contact surface (41) are in intermeshing logarithmic spiral shapes.

10. The impact contact surface shape of an impact wrench defined in claim 9, wherein the rotary shaft (1) is configured with a base plate (13) to load the stopping block (3), the base plate (13) is located at one end of the rotary shaft (1), the stopping block (3) is formed on the base plate (13).

* * * * *